United States Patent
Yamini et al.

(10) Patent No.: US 9,632,921 B1
(45) Date of Patent: Apr. 25, 2017

(54) VALIDATION USING SCENARIO RUNNERS

(71) Applicant: Microsoft Technology Licensing, LLC, Redmond, WA (US)

(72) Inventors: Smriti Yamini, Redmond, WA (US); Bhalakumaaran Erode Ranganathan, Bellevue, WA (US); Ling Yu, Federal Way, WA (US); Suresh Parameshwar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/941,089

(22) Filed: Nov. 13, 2015

(51) Int. Cl.
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
CPC ............. G06F 11/3688; G06F 11/3692; G06F 11/3684
USPC ........................................................ 717/127
See application file for complete search history.

(56) References Cited

U.S. PATENT DOCUMENTS

| | | | |
|---|---|---|---|
| 5,487,169 A * | 1/1996 | Vraney | G06F 8/30 717/117 |
| 6,505,342 B1 | 1/2003 | Hartmann et al. | |
| 6,941,546 B2 | 9/2005 | Apuzzo et al. | |
| 7,178,063 B1 | 2/2007 | Smith | |
| 7,519,865 B1 * | 4/2009 | Maly | G06F 11/261 714/33 |
| 7,623,981 B2 | 11/2009 | Achkar et al. | |
| 7,685,472 B1 * | 3/2010 | Shibl | G06F 11/3688 714/38.13 |
| 7,779,374 B1 * | 8/2010 | Hamid | G06F 11/263 716/136 |
| 7,836,346 B1 | 11/2010 | Davidov et al. | |

(Continued)

FOREIGN PATENT DOCUMENTS

| | | |
|---|---|---|
| EP | 2246789 A1 | 11/2010 |
| WO | 2006111000 A1 | 10/2006 |

OTHER PUBLICATIONS

"Parallel Execution of test methods in TestNG", Published on: Nov. 24, 2014 Available at: http://seleniumeasy.com/testng-tutorials/parallel-execution-of-test-methods-in-testng.

(Continued)

*Primary Examiner* — Viva Miller
(74) *Attorney, Agent, or Firm* — Workman Nydegger

(57) ABSTRACT

The automated validation of one or more test cases in a validation pass. The validation pass is enabled using a plurality of scenario runners, which are executable components that respond to instructions to run one or more scenarios of a validation pass by beginning to run through such scenarios during the validation pass. The validation pass may be associated with a maximum time such that upper limits on how long the scenario runners may run is set. This likewise limits the time it takes to validate the results of the scenario. The scenario runners provide events that occur during the running of their respective scenarios into an event collector. The events of the validation pass may then be evaluated against one or more test cases to determine whether or not the events have a state indicative of a success or failure of each test cases.

21 Claims, 4 Drawing Sheets

(56) References Cited

U.S. PATENT DOCUMENTS

| | | | |
|---|---|---|---|
| 8,601,434 B2* | 12/2013 | De Keukelaere | G06F 11/3684 717/106 |
| 9,032,373 B1 | 5/2015 | Gupta et al. | |
| 2005/0144529 A1* | 6/2005 | Gotz | G06F 11/3684 714/38.1 |
| 2006/0052965 A1* | 3/2006 | Nodwell | G06F 11/3688 702/119 |
| 2006/0123389 A1* | 6/2006 | Kolawa | G06F 11/3616 717/101 |
| 2007/0118644 A1* | 5/2007 | Kaksonen | H04L 43/50 709/224 |
| 2007/0220341 A1* | 9/2007 | Apostoloiu | G06F 11/3684 714/33 |
| 2008/0040364 A1* | 2/2008 | Li | G06Q 10/10 |
| 2008/0120521 A1* | 5/2008 | Poisson | G06F 11/2294 714/26 |
| 2009/0106597 A1* | 4/2009 | Branca | G06F 11/3688 714/38.1 |
| 2009/0276663 A1 | 11/2009 | Kaksonen | |
| 2009/0307763 A1* | 12/2009 | Rawlins | G06F 9/44505 726/5 |
| 2010/0100872 A1* | 4/2010 | Mitra | G06F 11/3688 717/125 |
| 2010/0312592 A1* | 12/2010 | Sallakonda | G06Q 10/10 705/7.37 |
| 2012/0084538 A1* | 4/2012 | Alapati | G06F 11/2236 712/227 |
| 2012/0102462 A1 | 4/2012 | Kushneryk et al. | |
| 2013/0006568 A1* | 1/2013 | Baylis | G06F 11/3692 702/108 |
| 2013/0042222 A1 | 2/2013 | Maddela | |
| 2013/0117611 A1 | 5/2013 | Chakraborty et al. | |
| 2013/0332905 A1 | 12/2013 | Vikutan et al. | |
| 2014/0282411 A1 | 9/2014 | Liemandt et al. | |
| 2014/0282432 A1* | 9/2014 | Yoshida | G06F 11/3608 717/131 |
| 2015/0113331 A1 | 4/2015 | Bhattacharya et al. | |
| 2015/0347284 A1* | 12/2015 | Hey | G06F 11/3692 717/125 |

OTHER PUBLICATIONS

Garg, et al., "Parallel Execution of Prioritized Test Cases for Regression Testing", In Proceedings of Thirty-Sixth Australasian Computer Science Conference, Jan. 2013, pp. 61-68.

"International Search Report and Written Opinion Issued in PCT Application No. PCT/US2016/060418", Mailed Date: Jan. 23, 2017, 12 Pages.

\* cited by examiner

300

400

VALIDATION USING SCENARIO RUNNERS

BACKGROUND

Computing systems and associated networks have revolutionized the way human beings work, play, and communicate. Nearly every aspect of our lives is affected in some way by computing systems. It is important to the designers, engineers and customers of the software that such software functions as intended. Accordingly, prior to shipment, software often undergoes rigorous testing so as to preferably detect faults prior to shipment. If defects are found after shipment, the default can be fixed via a software update.

The capabilities of computing systems has expanded greatly in recent years, with vast improvements processing, storage, and bandwidth capabilities. Along with such improvements, the complexity of software has vastly increased. Furthermore, collaboration between computing systems has increased with each computing system perhaps playing a role in a complex network of computing systems.

Testing of software in the face of computing complexity is likewise difficult. Nevertheless, it is critically important that software be tested to be sure that it functions as intended. Testing has conventionally involved running a variety of scenarios to see if the software functioned as intended. However, with the complexity of software ever growing, the number of possible scenarios that software may encounter explodes seemingly exponentially. Accordingly, it is quite a task for a tester to run through such scenarios even if the tester could contemplate the variety of scenarios that the computing system might encounter. Thus, conventionally, the testing of software has recently become more automated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the validation of one or more test cases in a validation pass. A validation pass is the period in which a set of one or more test cases are validated against events that were generated by running a set of scenarios. The validation pass is enabled using a plurality of scenario runners, which are executable components that respond to instructions to run one or more scenarios of a validation pass by beginning to run through such scenarios during the validation pass. In one embodiment, the validation pass is associated with a maximum time such that upper limits on how long the scenario runners may run is set. This likewise limits the time it takes to validate the results of the scenario. The scenario runners provide events that occur during the running of their respective scenarios into an event collector. The events of the validation pass may then be evaluated against one or more test cases to determine whether or not the events have a state indicative of a success or failure of each test cases.

In some embodiments, a controller assigns the scenarios to each of the scenario runners. Each scenario runner may perhaps run multiple scenarios in a given validation pass. There is no requirement that the scenario run by one scenario runner be completely independent of a scenario run by another scenario runner. In fact, these scenarios may even interact, such as through communication. Furthermore, the scenarios may even be identical. Thus, the controller may assign scenarios to the scenario runners such that complex multi-node systems are emulated. When the validator evaluates test cases, the events germane to that test case may thus be generated by multiple scenario runners if the test case evaluates functionality of a system of interacting computing systems. A feedback mechanism may be employed to change the maximum time of the validation pass, increase the number of scenario runners and/or alter the scenarios if the validator does not have enough events to positively gain a result (success or failure) for a substantial number of the test cases.

Accordingly, an automated mechanism for testing is provided in which validation may take a predictable amount of time, even for complex systems. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
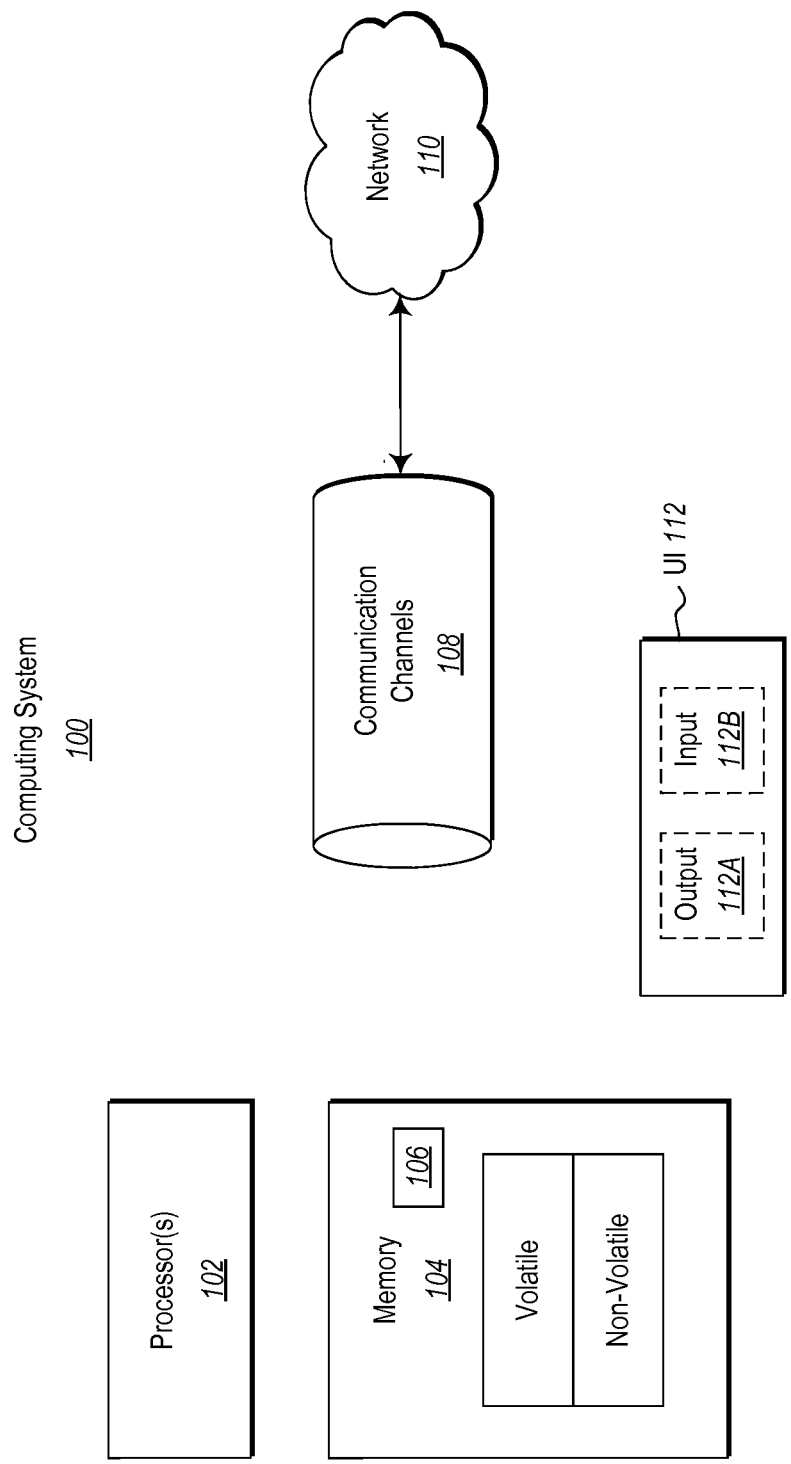
FIG. 1 abstractly illustrates a computing system in which some embodiments described herein may be employed.

At least some embodiments described herein relate to the validation of one or more test cases in a validation pass. A validation pass is the period in which a set of one or more test cases are validated against events that were generated by running a set of scenarios. The validation pass is enabled using a plurality of scenario runners, which are executable components that respond to instructions to run one or more scenarios of a validation pass by beginning to run through such scenarios during the validation pass. In one embodiment, the validation pass is associated with a maximum time such that upper limits on how long the scenario runners may run is set. This likewise limits the time it takes to validate the results of the scenario. The scenario runners provide events that occur during the running of their respective scenarios into an event collector. The events of the validation pass may then be evaluated against one or more test cases to determine whether or not the events have a state indicative of a success or failure of each test cases.

In some embodiments, a controller assigns the scenarios to each of the scenario runners. Each scenario runner may perhaps run multiple scenarios in a given validation pass. There is no requirement that the scenario run by one scenario runner be completely independent of a scenario run by another scenario runner. In fact, these scenarios may even interact, such as through communication. Furthermore, the scenarios may even be identical. Thus, the controller may assign scenarios to the scenario runners such that complex multi-node systems are emulated. When the validator evaluates test cases, the events germane to that test case may thus be generated by multiple scenario runners if the test case evaluates functionality of a system of interacting computing systems. A feedback mechanism may be employed to change the maximum time of the validation pass, increase the number of scenario runners and/or alter the scenarios if the validator does not have enough events to positively gain a result (success or failure) for a substantial number of the test cases.

Accordingly, an automated mechanism for testing is provided in which validation may take a predictable amount of time, even for complex systems. Some introductory discussion of a computing system will be described with respect to FIG. 1. Then, the use of the automatic testing mechanism will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "controller", "validator", "runner" or the like may also be used. As used in this description and in the case, these terms are also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
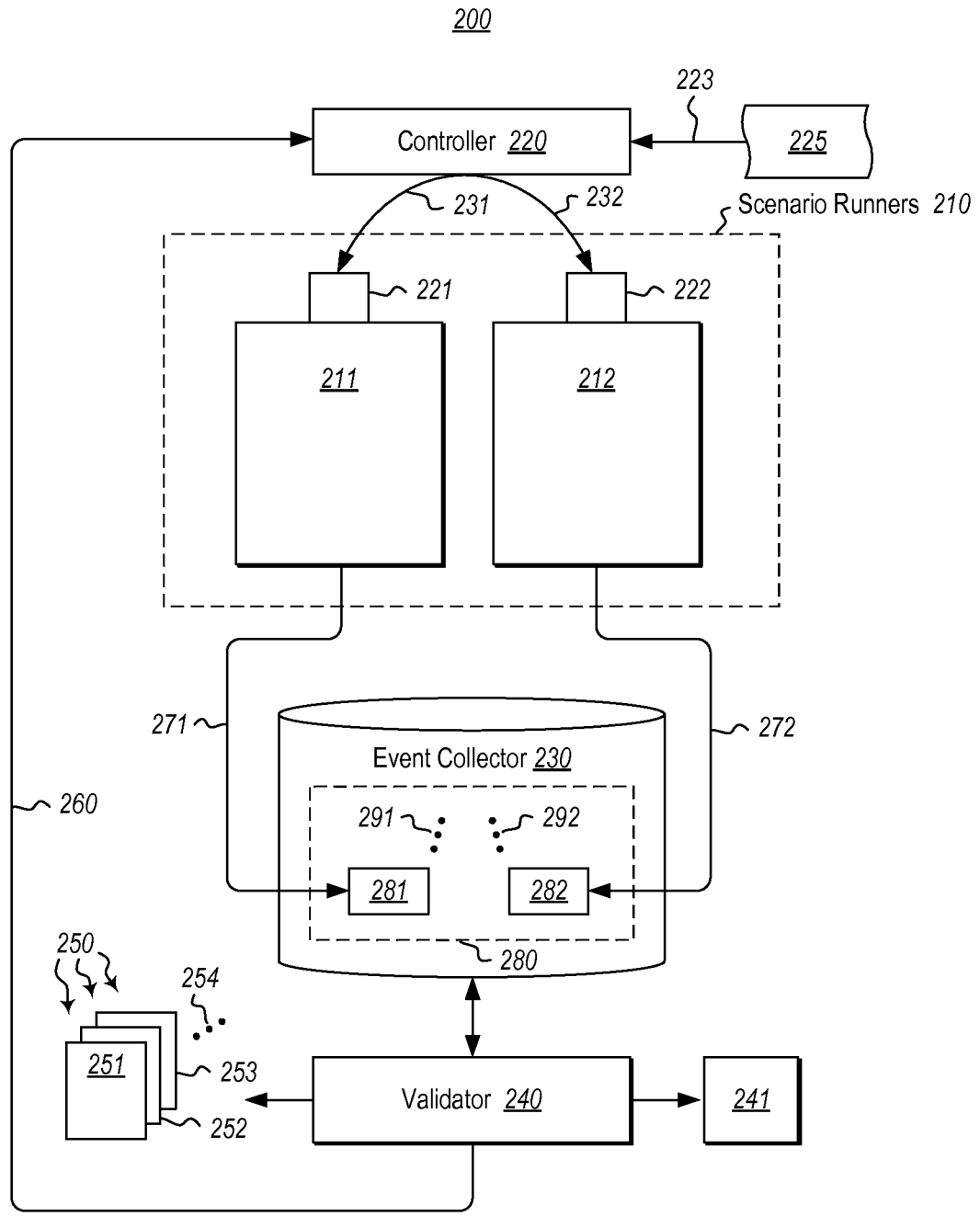
FIG. 2 illustrates a system for validating one or more test cases of a validation pass against scenarios run for that validation pass.

FIG. 2 illustrates a system 200 for validating one or more test cases of a validation pass against scenarios run for that validation pass. A validation pass is the period in which a set of one or more test cases are validated against events that were generated by running a set of scenarios. The system 200 includes multiple scenario runners 210 that are controlled by a controller 220 and that report events that occur during running of the scenarios to an event collector 230. The controller 220 places an upper limit on validation pass so as to effectively limit the number of scenarios run by the scenario runners 210 within a given validation pass. The scenario runners themselves perform no validation of the running of its own scenarios.

Rather, to complete a validation pass, a validator 240 evaluates the state of events of the validation pass in the event collector 230 to examine whether or not the events have a state corresponding to one or more test cases 250, to thereby provide validation results 241. If the event state does indicate that a test case is successful, then the test case is validated as a success. If the state of events in the event collector 230 indicates that the test case is not successful, then the test case is measured as a failed test case. If the event state is insufficient to make a determination, then no conclusion is reached regarding that test case. If there are significant inconclusive test cases for a validation pass, the validator 240 may provide feedback 260 to the controller 220 to adjust the next validation pass (e.g., by increasing the number of scenarios run and/or changing the scenarios run) so as to more likely result in more conclusive validation in a subsequent validation pass. The controller 220 may also perform actions on the scenario runners during a validation. For instance, the controller 220 might provide an instruction to crash one of the scenario runners so that the validator can determine the impact of that crash.

Each of the components 210, 220, 230 and 240 may be an example of the executable component 106 of FIG. 1, and thus have the structure that has been described above for the executable component 106. Each of the components 210, 220, 230 and 240 may be executed on a computing system 100 such as the computing system of FIG. 1. However, the components need not run on the same computing system. For instance, the system 200 may be a distributed system. In one embodiment, one or more or all of the components of the system 200 may run in a cloud computing environment.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud" or a "cloud computing environment" is an environment in which cloud computing is employed.

Figure 3:
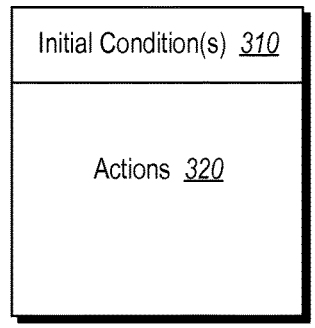
FIG. 3 illustrates an example symbolic structure of a scenario.

Each of the components of the system 200 will now be described in further detail. The system 200 includes multiple scenario runners 210. A scenario runner is an executable component that runs one or more scenarios as part of a validation pass, and reports events that occur during the running of the scenario. FIG. 3 illustrates an example symbolic structure of a scenario 300. Each scenario includes initial conditions 310 and actions 320 taken from that initial state. As an example only, such actions 320 might include for one scenario logging into an account, sending a message, and then logging out of an account. For another example scenario, the actions might include logging into an account, receiving a message, and then logging out of an account. Logging in and logging out are typically user activities, but the scenario runner may automate that process for purposes of running the scenario to generate a set of events that would closely match the events had the user herself run through the scenario using her computing system, albeit with perhaps a faster user response. To change a scenario, one could change either the initial conditions 310, the actions 320 taken, or both.

In the example of FIG. 2, there are two scenario runners 211 and 212 shown in operation. However, the ellipses 213 represent that there may be any number of scenario runners in operation that are running scenarios as part of a validation pass. There may potentially be many or perhaps enumerable numbers of scenario runners 210 running. When running a scenario, a scenario runner detects certain events that are written to an event collector 230 (such as a log or database). For instance, scenario runner 211 writes (as represented by arrow 271) event 281 to the event collector 230, amongst potentially other events as represented by the ellipses 291. Also, scenario runner 212 writes (as represented by arrow 272) event 282 to the event collector 230, amongst potentially other events as represented by the ellipses 292. The event collection 280 represents all events that have been written by a scenario runner 210 to the event collector 230 as part of a validation pass. A given scenario runner may run a single scenario for a validation pass, but may also run multiple scenarios for a validation pass.

In one embodiment, the number of scenario runners instantiated for a particular validation pass, and the scenarios assigned to each scenario runner is determined by, for instance, the controller 220. As an example, the controller 220 may instruct (as represented by arrow 231) the scenario runner 211 to run multiple scenarios as part of the validation pass. The scenario runner 211 is shown as including a queue 221 that holds scenarios awaiting running by the scenario runner 211 as part of the validation pass. How the queue is implemented is not critical to the principles described herein. The controller may provide the scenarios it knows it assigns the scenario runner 211 one at a time upon completion of the prior scenario. Alternatively or in addition, some or all of the scenarios assigned to the scenario runner 211 may be placed in the queue 221 for the scenario runner 211 to go through without further interaction with the controller 210. The controller 220 is also shown as instructing (as represented by arrow 232) the scenario runner 212 to run multiple scenarios as part of its validation pass by placing (as shown by arrow 232) such scenarios within the queue 222. The scenario controller 220 has access (as represented by arrow 223) to a configuration file 225 corresponding to the validation pass, and provides the instructions 231, 232 in accordance with the configuration file in order to keep the queues populated.

The scenario controller may give instructions associated with a validation pass such that scenarios running on different scenario runners collaborate to operate as a system. For instance, the scenario runner 211 may run a scenario in which the actions involve communication with a scenario on the scenario runner 212 to thereby run a scenario involving a system of two network nodes. The validator 240 may validate a test case that involves the operation of such a two node system by evaluating the events (e.g., events 281, 291, 282, 292) associated with both scenarios. This principle can be extended to systems involving any number of nodes where the operation of each node is assigned as a scenario to a different scenario runner. Such system scenarios may all run simultaneously so that the validator 240 can verify actual communications, but inference of communication may be made even if the scenarios are run at different times. Also, scenarios run by different scenario runners may, but need not, be different scenarios. For example, multiple scenario runners may be running the same scenario. This may be helpful when the test case is designed to measure resiliency when multiple nodes in the network are performing the same task.

In one embodiment, the scenario controller 220 is configured to control a maximum time of the validation such as that any unfinished scenarios that are assigned to a scenario runner that remain unfinished at the expiration of that maximum time remain unfinished. Accordingly, scenarios assigned to a scenario runner as part of a validation pass are not guaranteed to be completed. Rather, the controller 220 imposes some time restriction on the validation pass. The number of scenarios that could be run may be practically infinite. Thus, the scenario runners may run forever trying to capture every possible scenario. However, such may result in diminishing return as a running a more finite and manageable number of scenarios may be perfectly adequate in order to validate the test cases 250.

The validator 240 is configured to evaluate each test case 250 by determining if the collected events 280 of the validation pass correspond to a particular state. For instance, in FIG. 2, for this validation pass, the validator 240 is shown as evaluating test cases 251, 252 and 253. However, the ellipses 254 represent that the principles described herein are not limited to verification of any particular number of test cases as part of a validation pass. As an example, if the test case is to verify that one node in a network is able to transmit a message to another node in the network, the validator 240 may look for an event of one scenario that shows sending of a message, and a corresponding event of another scenario that shows receiving the message. More complex test cases would involve, of course, more complex analysis of the event state.

Figure 4:
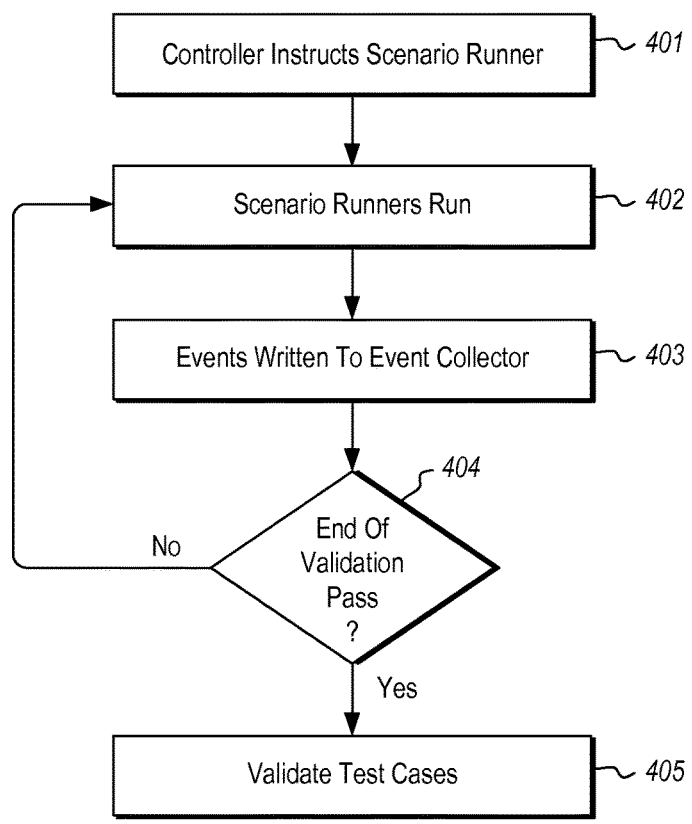
FIG. 4 illustrates a flowchart of a method for validating one or more test cases of a validation pass against scenarios run for that validation pass.

FIG. 4 illustrates a flowchart of a method 400 for validating one or more test cases of a validation pass against scenarios run for that validation pass. The method 400 may be performed by the system 200 of FIG. 2, and thus will be described with reference to FIGS. 2 and 4.

The scenario controller causes multiple scenario runners to each begin running a corresponding set of one or more scenarios as part of the validation pass (act 401). This is represented by FIG. 2 by the controller 220 providing instructions (as represented by arrows 231 and 232) to the scenario runners 210. Specifically, as part of the validation run, controller 220 instructs (as represented by arrow 231) the scenario runner 211 to run one set of scenarios; and instructs (as represented by arrow 232) the scenario runner 212 to run another set of scenarios.

The scenario runners each then run (act 402), and the resulting events are written into the event collector (act 403). For instance, the scenario runners 211 and 212 each run as instructed by the controller 220. As a result, the scenario runner 211 writes events 281 and 291 to the event collector 230 as represented by arrow 271. Furthermore, the scenario runner 212 writes events 282 and 292 to the event collector 230 as represented by arrow 272. This process continues ("No" in decision block 404), until the validation pass ends ("Yes" in decision block 404). This end of the validation pass might occur if, for example, all scenario runners complete their assigned scenarios for the validation pass, or if the maximum time for the validation pass is otherwise reached.

The validator then runs the validation for each test case (act 405) using the collection of events generated by the scenario runners running the scenarios of the validation pass. For instance, the validator 240 validates each of the test cases 250 by determining whether or not the event collection 280 has a particular state. As previously mentioned, this state may represent events that shown interplay between scenarios that ran on different scenario runner. The state may also correspond to initial event conditions and/or final event conditions. Also, the controller 220 may itself write events into the event collection 280. The validator 240 may also use the controller-generated events in order to validate the test cases.

Figure 5:
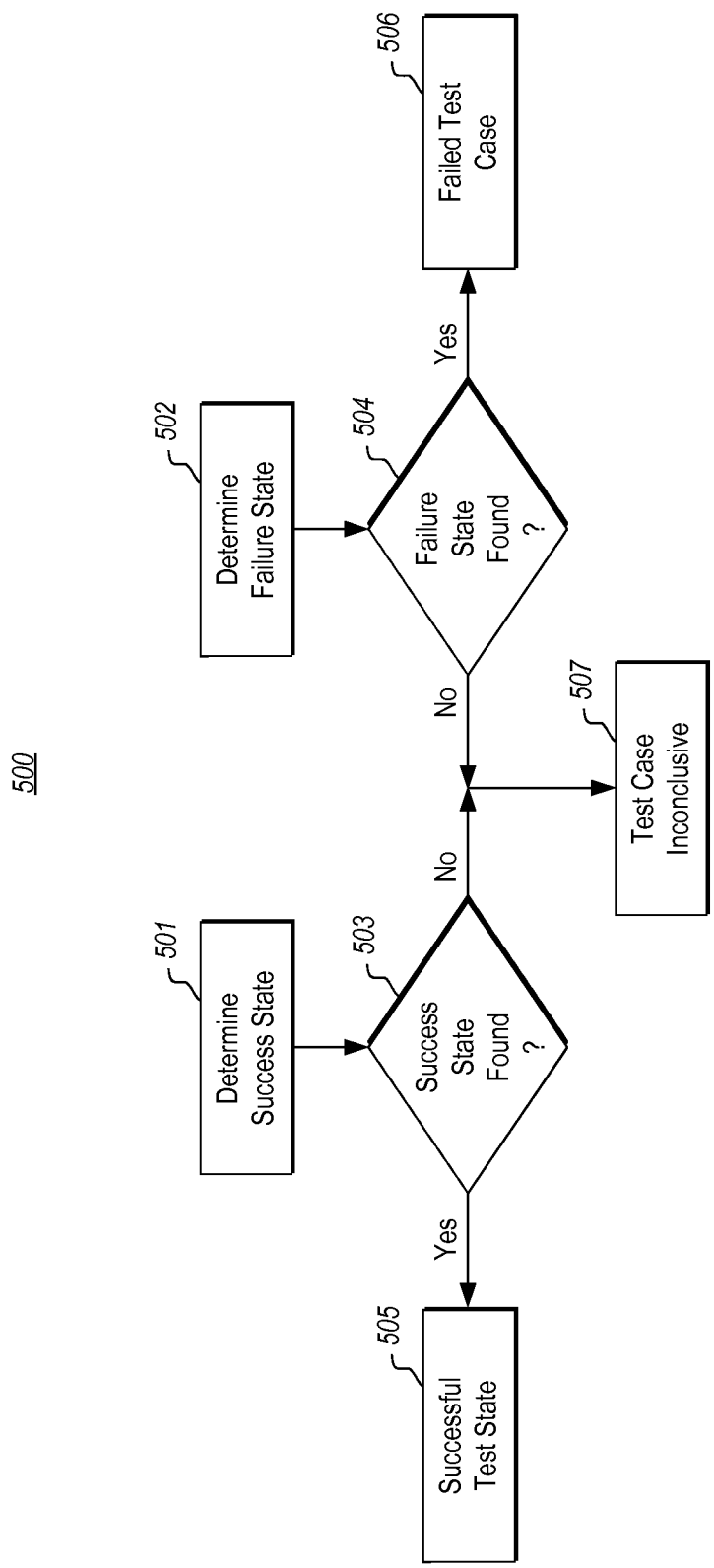
FIG. 5 illustrates a flowchart of a method for validating a test case.

FIG. 5 illustrates a flowchart of a method 500 for validating a test case. The method 500 may be performed by the validator 240 on each test case 251, 252, 253 and 254 in order to perform the validation of act 405 in FIG. 4. For each test case, a potential success state of events is determined (act 501) that, if present within the events collected during the validation pass, would indicate that the test case is a successful test case. Alternatively or in addition, a potential failure state of events is determined (act 502) that, if present within the events collected during the validation pass, would indicate that the test case is a failed test case. If the success state is found ("Yes" in decision block 503), then the test case is determined to be a successful test case (act 505), and this may be included in the validation results 241 of FIG. 2. On the other hand, if the failure state is found ("Yes" in decision block 504), then the test case is determined to be a failed test case, and this may also be included in the validation results 241 of FIG. 2. If neither a success state nor a failure state is found, the validation of the test case is determined to be inconclusive (act 507).

If there are too many inconclusive test cases, the validator may provide feedback to the controller to thereby alter change the controller performance such that in a successive validation pass performed on previously inconclusive test cases, a final result of that test case may more likely be determined in a subsequent validation pass. This feedback is represented in FIG. 2 by the validator 240 providing feedback (as represented by the arrow 260) to the controller 220.

The resulting adjustment in the controller may be result in change in the number of scenario runners 210 that run, a change in the scenarios that are associated to the scenario runners, a change in distribution of the scenarios amongst the scenario runs, a change in order of operation of the scenarios, a change in the maximum time of the validation pass, and/or so forth. The threshold for when adjustment is made via such feedback 260 may be any threshold, and may be a function of the percentage of test cases that are inconclusive, the importance of test cases that are inconclusive, an estimate on how close the validator was to reaching a determination, and so forth.

Accordingly, the principles described herein provide an effective mechanism for validating test cases based on events generated as a result of running scenarios. The length of time of a given validation pass is within a limit, thus making validation much more efficient. If the scenarios run were insufficient to perform validation of a test case, feedback may be performed so as to more likely conclusively validate a test case in the future. Thus, the principles described herein represent an advancement in the state of the art of testing software to verify proper operation, even on multi-nodal distributed systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for validating a test case of a validation pass against a scenario that is run for that validation pass, the system comprising:
   one or more processors; and
   memory having stored instructions that are executable by the one or more processors for implementing:
   a controller that is configured to control one or more scenario runners, wherein a performance of the controller is adjustable, and wherein the controller is further configured to control a maximum time for the validation pass such that unfinished scenarios assigned to the scenario runner are not completed if the maximum time is reached; and
   a scenario runner that is one of a plurality of scenario runners that are each controlled by the controller, the scenario runner being configured to:
   run the scenario for the validation pass; and
   report any events that occur while the scenario is being run; and
   a validator that is configured to:
   use the test case to perform an evaluation of the reported events, wherein the evaluation includes determining whether any of the reported events have a state corresponding to the test case; and
   provide feedback to the controller regarding the evaluation;
   whereby, after receiving the feedback, a determination is made as to whether the performance of the controller is to be adjusted, the determination at least partially being based on a percentage of prior test cases that were previously determined to be inconclusive, and wherein adjusting the controller is performed by at least one of the following 1) changing the maximum time for the validation pass, 2) changing a number of the plurality of scenario runners, or 3) changing at least one scenario that the controller causes to be run.

2. The system of claim 1, wherein the scenario runner is configured to run a second scenario for the validation pass.

3. The system of claim 1, wherein the controller is further configured to instruct each of the one or more scenario runners to run a corresponding set of one or more scenarios for the validation pass.

4. The system of claim 3, wherein the events are reported to an event collector, and wherein the controller is also configured to write events to the event collector.

5. The system of claim 3, wherein the controller is further configured to provide instructions to the scenario runner in accordance with a configuration file.

6. The system of claim 3, wherein the controller is further configured to provide instructions to the scenario runner so that the scenario running on the scenario runner can collaborate with other scenarios running on different scenario runners.

7. The system of claim 3, wherein the controller is further configured to control the scenario runner while the validation pass is occurring.

8. The system of claim 7, wherein the controller is further configured to control the scenario runner while the validation pass is occurring by causing the scenario runner to crash during the validation pass.

9. The system of claim 1, further comprising:
an event collector that is configured to collect the reported events.

10. The system of claim 9, wherein the event collector comprises at least one of a log or a database.

11. The system of claim 1, wherein the state corresponding to the test case comprises an event pattern.

12. The system of claim 1, wherein the state corresponding to the test case comprises an initial or final event condition.

13. The system of claim 1, wherein the state corresponding to the test case represents an interplay between scenarios that ran on different scenario runners.

14. The system claim 10, wherein the determination as to whether the performance of the controller is to be adjusted is also based on an indication that there are insufficient successful results of validation.

15. A method for validating a test case of a validation pass against a scenario that is run for that validation pass, the method comprising:
causing a scenario runner to run the scenario for the validation pass, wherein a maximum time for the validation pass is controllable such that unfinished scenarios assigned to the scenario runner are not completed if the maximum time is reached, and wherein the scenario runner is one of a plurality of scenario runners;
reporting any events that occur while the scenario is being run;
using the test case to perform an evaluation of the reported events, wherein the evaluation includes determining whether any of the reported events have a state corresponding to the test case;
providing feedback to a controller that controls the scenario runner regarding the evaluation; and
determining whether a performance of the controller is to be adjusted, wherein the determining is at least partially based on a percentage of prior test cases that were previously determined to be inconclusive, and wherein adjustments to the controller include at least one of the following 1) changing the maximum time for the validation pass, 2) changing a number of the plurality of scenario runners, or 3) changing at least one scenario that the controller causes to be run.

16. A computer program product comprising one or more computer-readable hardware storage media having thereon computer-executable instructions that are executable by one or more processors of a computing system to configure the computing system to validate a test case of a validation pass against a scenario that is run for that validation pass by performing the following:
causing a scenario runner to run the scenario for the validation pass, wherein a maximum time for the validation pass is controllable such that unfinished scenarios assigned to the scenario runner are not completed if the maximum time is reached, and wherein the scenario runner is one of a plurality of scenario runners;
reporting any events that occur while the scenario is being run;
using the test case to perform an evaluation of the reported events, wherein the evaluation includes determining whether any of the reported events have a state corresponding to the test case;
providing feedback to a controller that controls the scenario runner regarding the evaluation; and
determining whether a performance of the controller is to be adjusted, wherein the determining is at least partially based on a percentage of prior test cases that were previously determined to be inconclusive, and wherein adjustments to the controller include at least one of the following 1) changing the maximum time for the validation pass, 2) changing a number of the plurality of scenario runners, or 3) changing at least one scenario that the controller causes to be run.

17. The method of claim 15, wherein a queue holds additional scenarios that are waiting to be run by the scenario runner.

18. The method of claim 15, wherein the scenario runner runs a second scenario, wherein, prior to a completion of using a second test case to perform a second evaluation, the second evaluation is stopped, and wherein the determining whether the performance of the controller is to be adjusted is also based on an estimate regarding how close the evaluation was to being complete.

19. The system of claim 1, wherein the adjusting the controller comprises changing the maximum time for the validation pass.

20. The system of claim 1, wherein the adjusting the controller comprises changing the number of the plurality of scenario runners.

21. The system of claim 1, wherein the adjusting the controller comprises changing the at least one scenario that the controller causes to be run.

* * * * *